United States Patent
Xu et al.

(10) Patent No.: US 9,982,383 B2
(45) Date of Patent: May 29, 2018

(54) WATER-SAVING WASHING MACHINE AND CONTROL METHOD

(71) Applicants: HAIER GROUP CORPORATION, Shandong (CN); QINGDAO HAIER WASHING MACHINE CO., LTD., Shandong (CN)

(72) Inventors: Sheng Xu, Shandong (CN); Chunfeng Lao, Shandong (CN); Xiuwen Peng, Shandong (CN); Liang Sun, Shandong (CN); Shilong Hao, Shandong (CN); Yimin Li, Shandong (CN)

(73) Assignees: Haier Group Corporation, Shandong (CN); Qingdao Haier Washing Machine Co., Ltd., Shandong (CN)

( * ) Notice: Subject to any disclaimer, the term of this patent is extended or adjusted under 35 U.S.C. 154(b) by 0 days. days.

(21) Appl. No.: 15/103,654

(22) PCT Filed: Jul. 2, 2014

(86) PCT No.: PCT/CN2014/081463
§ 371 (c)(1),
(2) Date: Jun. 10, 2016

(87) PCT Pub. No.: WO2015/085758
PCT Pub. Date: Jun. 18, 2015

(65) Prior Publication Data
US 2016/0305059 A1    Oct. 20, 2016

(30) Foreign Application Priority Data

Dec. 12, 2013 (CN) .......................... 2013 1 0680109
Jun. 9, 2014 (CN) .......................... 2014 1 0252442

(51) Int. Cl.
*D06F 35/00* (2006.01)
*D06F 39/00* (2006.01)
(Continued)

(52) U.S. Cl.
CPC .......... *D06F 39/006* (2013.01); *D06F 35/006* (2013.01); *D06F 39/08* (2013.01);
(Continued)

(58) Field of Classification Search
CPC ...... D06F 35/006; D06F 39/006; D06F 39/08; D06F 39/085; D06F 39/10;
(Continued)

(56) References Cited

U.S. PATENT DOCUMENTS 5,868,937 A      2/1999  Back
6,167,733 B1 *   1/2001  Lee ...................... D06F 39/085
                                                          68/18 F
(Continued)

FOREIGN PATENT DOCUMENTS

CN      1757814 A       4/2006
CN    101153443 A       4/2008
(Continued)

OTHER PUBLICATIONS

Masanobu et al., "JPH0679094A English Machine Translation.pdf", Mar. 22, 1994—Machine translation from Espacenet.com.*
International Search Report dated Sep. 3, 2014 from International Patent Application No. PCT/CN2014/081463 filed Jul. 2, 2014.
International Search Report dated Jun. 6, 2017 from International Patent Application No. PCT/CN2014/081463 filed Jul. 2, 2014.

*Primary Examiner* — Levon J Shahinian
(74) *Attorney, Agent, or Firm* — Sunstone IP (57) ABSTRACT

A water-saving washing machine and a control method are provided. The washing machine includes a washing drum and an outer drum, where a circulating pipeline is arranged between an outer drum drainage outlet and an outer drum water inlet, a drainage pump and a main filter are arranged on the circulating pipeline, a pre-filter is further arranged on the circulating pipeline, the pre-filter is located between the drainage pump and the main filter, and a compactness of a filter screen of the pre-filter is lower than that of a filter screen of the main filter.

15 Claims, 8 Drawing Sheets

(51) Int. Cl.
*D06F 39/08* (2006.01)
*D06F 39/10* (2006.01)

(52) U.S. Cl.
CPC .......... *D06F 39/085* (2013.01); *D06F 39/10* (2013.01); *D06F 2226/00* (2013.01); *D06F 2232/00* (2013.01); *D06F 2232/06* (2013.01); *Y02B 40/56* (2013.01)

(58) Field of Classification Search
CPC ............ D06F 2226/00; D06F 2232/00; D06F 2232/06; Y02B 40/56
USPC ...... 8/158, 159; 68/12.13, 18 F, 18 FA, 18 R
See application file for complete search history.

(56) References Cited

U.S. PATENT DOCUMENTS

2006/0075577 A1* 4/2006 Jeong .................. D06F 25/00
 8/158
2008/0276964 A1* 11/2008 Hendrickson ......... D06F 35/005
 134/18

FOREIGN PATENT DOCUMENTS

| CN | 202860901 U | 4/2013 |
| JP | 0679094 A | 3/1994 |
| JP | H0679094 A | 3/1994 |
| WO | 02/48445 A1 | 6/2002 |

\* cited by examiner

WATER-SAVING WASHING MACHINE AND CONTROL METHOD

CROSS REFERENCE TO RELATED APPLICATIONS

This application is a U.S. National Stage of International Patent Application No. PCT/CN2014/081463, filed Jul. 2, 2014 which claims the benefit of Chinese Patent Application No. 201310680109.X filed on Dec. 12, 2013 and Chinese Patent Application No. 201410262442.5 filed Jun. 9, 2014.

BACKGROUND

Technical Field

The present disclosure relates to the field of washing machines, and particularly to a water-saving washing machine and a control method.

Background

With development of people's living standards, washing machine has gradually become one of necessary household appliances in people's home, and a majority of people use washing machine as a major tool for washing clothes. With deterioration of environment and pollution of water body, clean water resources gradually become scarce resources, and how to save water and power when washing clothes clean has always been one of focuses of attention by consumers.

A clothes-washing process of a washing machine mainly includes: washing, rinsing and spin-drying stages. In the washing stage, water and detergent are fed into the washing machine to wash clothes; and in the rinsing stage, to rinse away dirts and residual detergent, more water is needed to be fed or more times of rinse are needed for clothes rinsing, which undoubtedly consumes a big amount of water resources. This process needs to consume at least running water of 30 L since clothes are needed to be rinsed at least twice even for a water-saving drum-type washing machine. Sometimes twice rinse may be enough to rinse clothes clean because there are less dirts on clothes or less detergent being used. However, a user chooses to rinse thrice, which may undoubtedly cause waste of water resources. Therefore, how to weigh between water conservation and cleaning rate is undoubtedly a very important issue.

In addition, a same bucket of water is always used in an existing washing machine for washing and rinsing, clothes are always washed in dirty water, and thus both sense and psychology are poor.

A water-saving washing machine is disclosed by a Chinese Patent numbered 00231176.3. This water-saving washing machine is provided with a water filtering device which is provided with a shell. A water inlet of the water filtering device is connected to a water outlet of a washing drum, a rear end of the water filtering device is connected to a water outgoing device, another end of the water outgoing device is connected to the washing drum, and the water outgoing device includes a water pump and inlet and outlet pipes. Cyclic utilization of water may be implemented to reach an objective of water saving. However, in the foregoing patent, only one filter is disposed so that the filter is easy to be blocked, and no flushing system is disposed. The filter needs to be replaced once it is blocked, thereby increasing cost and affecting use.

In view of this, the present disclosure is proposed.

SUMMARY

An objective of the present disclosure is to provide a water-saving washing machine and a control method to overcome disadvantages of an existing art. A pre-filter may be added before a main filter so that large-particle impurities are prevented from entering the main filter to damage the main filter, a service life and a use effect of the main filter can be improved. Water in a washing drum during washing and rinse processes is in a clean water state, and clothes are always washed in clean water, so that sense and psychology of a user are improved. Filters are washed to prevent the filters from being blocked, thereby prolonging a service life of the filters, preventing filtering effect deterioration or unavailability of the filters due to too many impurities, and reducing maintenance costs. The pre-filter and the main filter are controlled by turning on/off an air pump and turning on/off valves for separately or simultaneously performing air washing and water washing, thereby improving cleaning efficiency and making control simple and easy.

In order to implement the objective, the present disclosure adopts following technical solutions. A water-saving washing machine, including a washing drum and an outer drum, where a circulating pipeline is arranged between an outer drum drainage outlet and an outer drum water inlet, a drainage pump and a main filter are arranged on the circulating pipeline, a pre-filter is further arranged on the circulating pipeline, the pre-filter is located between the drainage pump and the main filter, and a compactness of a filter screen of the pre-filter is lower than that of a filter screen of the main filter.

A first inlet is disposed before the filter screen of the pre-filter and is communicated with the drainage pump, a second inlet is disposed before the filter screen of the main filter, the pre-filter is provided with a first outlet before the filter screen and is provided with a second outlet after the filter screen, the main filter is provided with a third outlet before the filter screen and is provided with a fourth outlet after the filter screen, the second outlet is communicated with the second inlet, the fourth outlet is communicated with a water inlet of the washing drum, and the first outlet and the third outlet are communicated with a washing machine drainage pipe.

The pre-filter is provided with a third inlet, the third inlet is connected to an air pump through a pipeline, and the pipeline between the air pump and the third inlet is further provided with a check valve for controlling airflow to flow from the air pump to the pre-filter.

The pre-filter is provided with an aeration device positioned between the third inlet and the filter screen, the aeration device is a flat plate that fits to the pre-filter in cross-section shape, and the flat plate is evenly provided with a plurality of air holes.

Inlets of the pre-filter and the main filter are positioned at lower parts, outlets of the pre-filter and the main filter are positioned at upper parts, a pore diameter of the filter screen of the main filter ranges from 0.001 μm to 0.1 μm, for example ranges from 0.01 μm to 0.1 μm, the main filter may be an external-pressure ultrafiltration membrane, and a pore diameter of the filter screen of the pre-filter ranges from 10 μm to 300 μm.

A pipeline between the first outlet and the washing machine drainage pipe is provided with a first valve, a pipeline between the third outlet and the washing machine drainage pipe is provided with a second valve, and the first valve and the second valve may be electric switching ball valves.

A control method of the water-saving washing machine is provided, where a circulating filtration step is added in a washing and/or rinse process, the method includes: starting the drainage pump, pumping, by the drainage pump, washing water or rinse water to the pre-filter for preliminary filtration by the filter screen, and to the main filter for deep filtration by the filter screen, so that small-particle impurities in the water are filtered out by the pre-filter and the main filter, and filtered water flows back to the outer drum through the outer drum water inlet for participation in washing or rinse again.

The circulating filtration step at least includes one intermediate cleaning process of the pre-filter and/or the main filter; the intermediate cleaning process includes an air washing process in which air is introduced into the pre-filter and/or the main filter for cleaning the filter screens of the pre-filter and/or the main filter by means of bubble motion, explosion or vibration, and/or a water washing process in which water flow is introduced before the filter screens of the pre-filter and/or the main filter so that the water flow is discharged before the filter screens to clean out impurities on the filter screens of the pre-filter and/or the main filter by means of water flow scouring.

The pre-filter and the main filter are controlled by turning on/off the air pump and turning on/off the valves for separately or simultaneously performing air washing and water washing, which specifically includes:

turning on the air pump and the second valve for simultaneously performing air washing to the pre-filter and the main filter for 10 s-120 s, turning off the air pump and the second valve and turning on the drainage pump and the first valve for performing water washing to the pre-filter for 5 s-20 s, and turning off the first valve and turning on the second valve for performing water washing to the main filter for 10 s-60 s; or turning on the air pump and the first valve for performing air washing to the pre-filter for 10 s-120 s, turning off the air pump and turning on the drainage pump for performing water washing to the pre-filter for 5 s-20 s, turning off the drainage pump and the first valve and turning on the air pump and the second valve for performing air washing to the main filter for 10 s-60 s, and turning off the air pump and turning on the drainage pump for performing water washing to the main filter for 10 s-60 s; or turning on the air pump and the first valve for performing air washing to the pre-filter for 10 s-120 s, turning off the air pump and turning on the drainage pump for performing water washing to the pre-filter for 5 s-20 s, turning off the drainage pump and the first valve and turning on the air pump for performing air washing to the main filter for 5 s-20 s so that water flow inside the main filter is drained out from the second inlet; after the water flow inside the main filter is thoroughly drained out, turning on the second valve for 10 s-60 s so that water flow flows back to the main filter, where the second valve may be repeatedly turned on/off for many times; or turning on the air pump and the second valve for simultaneously performing air washing to the pre-filter and the main filter for 10 s-120 s, turning off the second valve for 5 s-20 s so that water flow inside the pre-filter and the main filter is drained out from bottom until water flow is thoroughly drained out, turning on the second valve for 10 s-60 s so that water flow flows back to the main filter, where the second valve may be repeatedly turned on/off for many times; turning off the air pump and the second valve and turning on the drainage pump and the first valve for performing water washing to the pre-filter for 5 s-20 s, and turning off the first valve and turning on the second valve for performing water washing to the main filter for 10 s-60 s.

The washing drum is internally provided with a turbidity detecting device for detecting turbidity of inside washing water or rinse water in real time, a circulating filtration procedure may be started when a turbidity is less than or equal to a set value, otherwise the circulating filtration procedure is not started.

The washing drum is internally provided with a turbidity detecting device for detecting turbidity of inside washing water or rinse water in real time, a circulating filtration procedure is started when a turbidity is less than or equal to a set value, otherwise the circulating filtration procedure is not started.

The water-saving washing machine of the present disclosure adopts an integrative structural design, and specifically includes following technical solutions.

A water-saving washing machine adopts an integrative structural design, where the pre-filter is provided with a first inlet and a second outlet, the main filter is provided with a second inlet and a fourth outlet, the first inlet is connected to the drainage pump, the second outlet is connected to the second inlet, the fourth outlet is connected to the outer drum water inlet; the first inlet is communicated with the drainage pump and inside of the filter screen of the pre-filter, the second outlet and the second inlet are respectively communicated with outside of the filter screen of the pre-filter and outside of the filter screen of the main filter, the fourth outlet is communicated with inside of the filter screen of the main filter and inside of the washing drum; and the pre-filter and the main filter are of an integrative design, and the second outlet of the pre-filter is communicated with the second inlet of the main filter.

Further, the pre-filter includes an upper end cover and a lower end cover, the filter screen is disposed between the upper end cover and the lower end cover, the upper end cover and a bottom of the main filter are connected together; there are a plurality of the second outlets which are evenly disposed on the upper end cover, the first inlet is disposed on the lower end cover, the second inlet is disposed at bottom of the main filter; and the second outlets directly lead to the second inlet without pipeline connection.

Further, the pre-filter is further provided with a first outlet connected to a washing machine drainage pipe; the main filter is provided with a third outlet connected to the washing machine drainage pipe; the first outlet is communicated with the inside of the filter screen of the pre-filter and the washing machine drainage pipe, and the third outlet is communicated with the outside of the filter screen of the main filter and the washing machine drainage pipe.

Further, the circulating pipeline is provided with a switching valve communicated with the first outlet, the third outlet and the washing machine drainage pipe, the switching valve may turn on/off a pre-filter drain channel formed between the first outlet and an outlet of the washing machine drainage pipe, and a main filter drain channel formed between the third outlet and the outlet of the washing machine drainage pipe; and optionally, the switching valve is a ball valve internally provided with multiple pathways.

Further, the outer drum is further provided with a spraying nozzle, the switching valve is also connected to the spraying nozzle, and the switching valve may turn on/off a spraying pathway formed between the first outlet and the spraying nozzle.

Further, the first inlet of the pre-filter is provided with a check device preventing sewage water from flowing back, optionally, the check device is a check ball whose diameter is greater than the diameter of the first inlet, a density of the check ball is greater than that of water, and optionally, the density of the check ball is 1-1.5 times of that of water.

Following beneficial effects are produced by adopting the technical solutions of the present disclosure.

1. In the present disclosure, a pre-filter may be added before the main filter, by preliminary filtration by the pre-filter and further filtration by the main filter, large-particle impurities are prevented from entering the main filter to damage the main filter, which may improve a service life and a use effect of the main filter.

2. The water-saving washing machine of the present disclosure makes water in the washing drum in a clean water state during washing and rinse processes, and clothes are always washed in clean water, so that sense and psychology of a user are improved.

3. In the present disclosure, a cleaning process is added in the circulating filtration process, filters are washed to prevent the filters from being blocked, thereby prolonging a service life of the filters, preventing filtering effect deterioration or unavailability of the filters due to too many impurities, and reducing maintenance costs.

4. In the present disclosure, the pre-filter and the main filter are controlled by turning on/off the air pump and turning on/off the valves for separately or simultaneously performing air washing and water washing, thereby improving cleaning efficiency and making control simple and easy.

5. Generally, filter membranes are blocked by impurities after a filter is used for a period of time. Therefore, after a period of time, the filter membranes need to be replaced. In the present disclosure, a washing step is added, which is a cleaning step combining water washing and air washing of the filter membranes. Cleaning of the filter membranes may reduce replacing frequency of filter membranes, prolong service life of the filter membranes, and reduce maintenance frequency and maintenance cost of the washing machine.

6. The pre-filter and the main filter of the water-saving washing machine of the present disclosure adopt an integrative structural design. The pre-filter and the main filter are designed as an entirety, which not only greatly reduces occupied space, but also dispenses with connecting the pre-filter with the main filter by using pipelines. Therefore, on one hand, pipelines may be saved and cost may be reduced, and on the other hand, an installation process is simplified and a working efficiency is improved.

7. The pre-filter and the main filter of the water-saving washing machine of the present disclosure adopt an integrative structural design, so that the second outlet of the pre-filter is directly coincident with the second inlet of the main filter, thereby avoiding pipeline connection. In this way, it is possible to effectively solve a problem that an effect in cleaning the filter screens is poor due to attenuation of airflow produced by the air pump in a connecting pipeline when air washing is performed on the pre-filter and the main filter.

8. The water-saving washing machine of the present disclosure adopts a switching valve having multiple pathways to connect the first outlet, the third outlet, the fourth outlet, the outer drum water inlet, the spraying nozzle of the outer drum and the washing machine drainage pipe together, on/off of different pathways are implemented by controlling the switching valve, thereby reducing installation space and assembly process, making it easy to control, and saving assembly cost and control circuit cost.

Following further describes specific implementation modes of the present disclosure in detail with reference to the accompanying drawings.

descriptions of reference numbers are as below.

1: outer drum, 2: outer drum drainage outlet, 3: outer drum water inlet, 4: drainage pump, 5: main filter, 6: pre-filter, 7: first inlet, 8: second inlet, 9: first outlet, 10: second outlet, 11: third outlet, 12: fourth outlet, 13: third inlet, 14: air pump, 15: check valve, 16: aeration device, 17: filter screen, 18: first valve, 19: second valve, 20: upper end cover, 21: lower end cover, 22: outer drum wall, 23: filter screen supporting frame, 25: air hole, 26: washing machine drainage pipe, 27: switching valve, 28: spraying nozzle, 29: check ball, 30: third valve.

DETAILED DESCRIPTION

Figure 1:
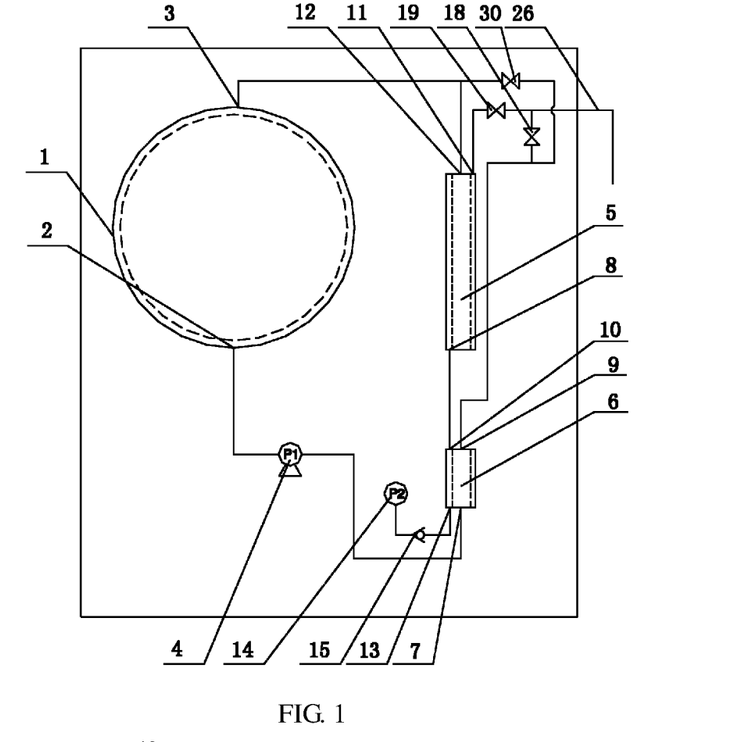
FIG. 1 is a schematic structural diagram showing a water-saving washing machine of the present disclosure.

As shown in FIG. 1, a water-saving washing machine of the present disclosure includes a washing drum and an outer drum 1, where a circulating pipeline is arranged between an outer drum drainage outlet 2 and an outer drum water inlet 3, a drainage pump 4 and a main filter 5 are arranged on the circulating pipeline, a pre-filter 6 is also arranged on the circulating pipeline, the pre-filter 6 is located between the drainage pump 4 and the main filter 5, the drainage pump 4, the pre-filter 6 and the main filter 5 are connected in sequence, and a compactness of a filter screen 17 of the pre-filter is lower than that of a filter screen of the main filter. Objectives of such a setting are as below. Water flow flows through the pre-filter 6 and then flows through the main filter 5, larger-diameter particle impurities in the water flow are filtered out by the pre-filter 6, and then small-diameter particle impurities in the water are filtered out by the main filter 5, so that large-particle impurities are prevented from entering the main filter 5 to damage the main filter 5, thereby improving a service life and a use effect of the main filter 5, and reducing maintenance frequency and cost.

Connection relations between various structures are as below. A first inlet 7 is disposed before the filter screen 17 of the pre-filter 6 and is communicated with the drainage pump 4, a second inlet 8 is disposed before the filter screen of the main filter, the pre-filter 6 is provided with a first outlet 9 before the filter screen 17 and is provided with a second outlet 10 after the filter screen 17, the main filter 5 is provided with a third outlet 11 before the filter screen and is provided with a fourth outlet 12 after the filter screen, the second outlet 10 is communicated with the second inlet 8, the fourth outlet 12 is communicated with the outer drum water inlet 3, and the first outlet 9 and the third outlet 11 are separately communicated with a washing machine drainage pipe 26.

The pre-filter 6 is provided with a third inlet 13, the third inlet 13 is connected to an air pump 14 through a pipeline, the pipeline between the air pump 14 and the third inlet 13 is further provided with a check valve 15 for controlling airflow to flow from the air pump 14 to the pre-filter 6.

Figure 4:
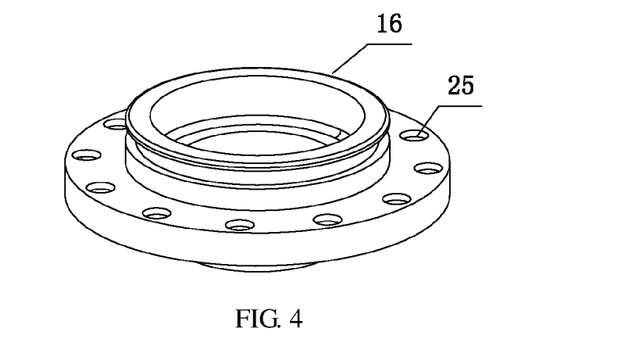
FIG. 4 is a structural diagram showing an aeration device of the present disclosure.

The pre-filter 6 is provided with an aeration device 16 positioned between the third inlet 13 and the filter screen 17, the aeration device 16 is a flat plate that fits to the pre-filter 6 in cross-section shape, and the flat plate is evenly provided with a plurality of air holes 25. The aeration device 16 may enable air pumped in by the air pump 14 to be evenly distributed around the filter screen 17 to thoroughly clean the filter screen without dead angle.

Inlets of the pre-filter 6 and the main filter 5 are positioned at lower parts, outlets of the pre-filter 6 and the main filter 5 are positioned at upper parts, air and water flow move from bottom to top with a better cleaning effect, a pore diameter of the filter screen of the main filter 5 ranges from 0.001 μm to 0.1 μm, for example ranges from 0.01 μm to 0.1 μm, the main filter 5 may be an external-pressure ultrafiltration membrane, a pore diameter of the filter screen 17 of the pre-filter 6 ranges from 10 μm to 300 μm, and the pre-filter can only provide a preliminary filtration of the water flow because a pore diameter of its filter screen is larger.

When the pore diameter of the filter screen of the main filter 5 is smaller than 0.01 μm, washing powder or washing solution dissolved in water may be filtered out, in such a case, a circulating filtration procedure cannot be started during washing. However, the circulating filtration procedure may be started in a rinsing process. After washing powder or washing solution dissolved in rinsing water is filtered out, the rinsing water enters the washing drum for rinsing again. In this way, washing powder not dissolved in water may be filtered while rinsing, thereby reducing time used for rinsing, reducing quantity of water used for rinsing, and ensuing to rinse clean.

When the pore diameter of the filter screen of the main filter 5 is greater than 0.01 μm, small-particle impurities (particle impurities smaller than the diameter of the filter screen) in water may be filtered out, however, impurities dissolved in water are unable to be filtered out, in such a case, the circulating filtration procedure can be started no matter during washing or rinsing.

The smaller the diameter of the filter screen of the main filter, the better the filtering effect, but the easier the filter screen is blocked. However, if the diameter of the filter screen of the main filter is too large, small-particle impurities in water cannot be filtered out. Therefore, the diameter of the filter screen of the main filter shall be reasonably set, and for example ranges from 0.01 μm to 0.1 μm.

A pipeline between the first outlet 9 and the washing machine drainage pipe 26 is provided with a first valve 18, a pipeline between the third outlet 11 and the washing machine drainage pipe 26 is provided with a second valve 19, the first valve 18 and the second valve 19 may be electric switching ball valves, and on/off of the pipelines are controlled by on/off of the valves.

In a washing and/or rinse process, a circulating filtration step is added, specifically: the drainage pump is started, washing water or rinse water is pumped by the drainage pump to the pre-filter for preliminary filtration by the filter screen, and then is pumped to the main filter for deep filtration by the filter screen, so that small-particle impurities in the water are filtered out by the pre-filter and the main filter, and filtered water flows back to the outer drum through the outer drum water inlet for participation in washing or rinse again. Water in the washing drum during washing and rinse processes is in a clean water state. Clothes are always washed in clean water, so that sense and psychology of a user are improved.

The circulating filtration step at least includes one intermediate cleaning process of the pre-filter and/or the main filter, the intermediate cleaning process includes an air washing process in which air is introduced into the pre-filter and/or the main filter for cleaning the filter screens of the pre-filter and/or the main filter by means of bubble motion, explosion or vibration, and/or a water washing process in which water flow is introduced before the filter screens of the pre-filter and/or the main filter so that the water flow is discharged before the filter screens to clean out impurities on the filter screens of the pre-filter and/or the main filter by means of water flow scouring. A cleaning process is added in the circulating filtration process, so that filters are washed to prevent the filters from being blocked, to prolong a service life of the filters, to prevent filtering effect deterioration or unavailability of the filters due to too many impurities, and to reduce maintenance cost and frequency.

Generally, filter membranes may be blocked by impurities after a filter is used for a period of time. Therefore, after a period of time, the filter membranes need to be replaced. In the present disclosure, a washing step is added, which is a cleaning step combining water washing and air washing of the filter membranes. Cleaning of the filter membranes may reduce replacing frequency of filter membranes, prolong service life of the filter membranes, and reduce maintenance frequency and maintenance cost of the washing machine. In the present disclosure, the pre-filter and the main filter are controlled by turning on/off the air pump and turning on/off the valves for separately or simultaneously performing air washing and water washing, which specifically includes:

turning on the air pump and the second valve for simultaneously performing air washing to the pre-filter and the main filter for 10 s-120 s, turning off the air pump and the second valve and turning on the drainage pump and the first valve for performing water washing to the pre-filter for 5 s-20 s, and turning off the first valve and turning on the second valve for performing water washing to the main filter for 10 s-60 s; or turning on the air pump and the first valve for performing air washing to the pre-filter for 10 s-120 s, turning off the air pump and turning on the drainage pump for performing water washing to the pre-filter for 5 s-20 s, turning off the drainage pump and the first valve and turning on the air pump and the second valve for performing air washing to the main filter for 10 s-60 s, and turning off the air pump and turning on the drainage pump for performing water washing to the main filter for 10 s-60 s; or turning on the air pump and the first valve for performing air washing to the pre-filter for 10 s-120 s, turning off the air pump and turning on the drainage pump for performing water washing to the pre-filter for 5 s-20 s, turning off the drainage pump and the first valve and turning on the air pump for performing air washing to the main filter for 5 s-20 s so that water flow inside the main filter is drained out from the second inlet; after the water flow inside the main filter is thoroughly drained out, turning on the second valve for 10 s-60 s so that water flow flows back to the main filter, where the second valve may be repeatedly turned on/off for many times; or turning on the air pump and the second valve for simultaneously performing air washing to the pre-filter and the main filter for 10 s-120 s, turning off the second valve for 5 s-20 s so that water flow inside the pre-filter and the main filter is drained out from bottom until water flow is thoroughly drained out, turning on the second valve for 10 s-60 s so that water flow flows back to the main filter, where the second valve may be repeatedly turned on/off for many times; turning off the air pump and the second valve and turning on the drainage pump and the first valve for performing water washing to the pre-filter for 5 s-20 s, and turning off the first valve and turning on the second valve for performing water washing to the main filter for 10 s-60 s.

The washing drum is internally provided with a turbidity detecting device for detecting turbidity of washing water or rinse water in real time, a circulating filtration procedure is started when a turbidity is less than or equal to a set value, otherwise the circulating filtration procedure is not started. For example, supposing the set value is 500NTU, the circulating filtration procedure may be started if the turbidity is less than or equal to 500NTU, and the circulating filtration procedure is not started if the turbidity is greater than 500NTU.

Embodiment I

Figure 2:
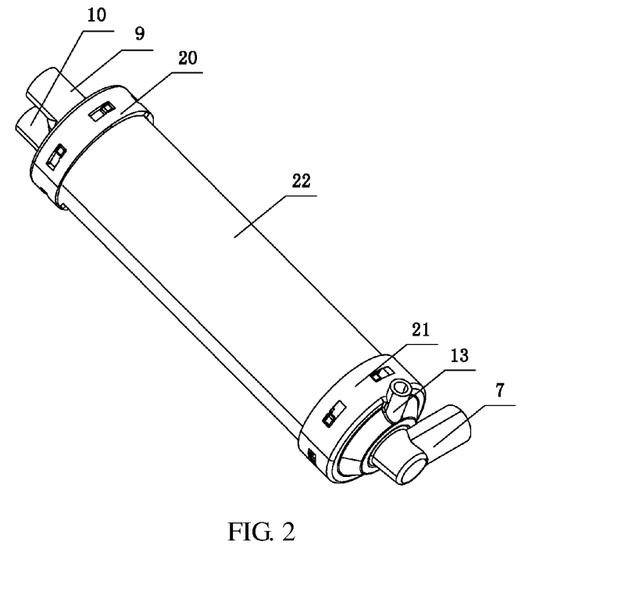
FIG. 2 is a structural diagram showing a pre-filter of the present disclosure.
Figure 3:
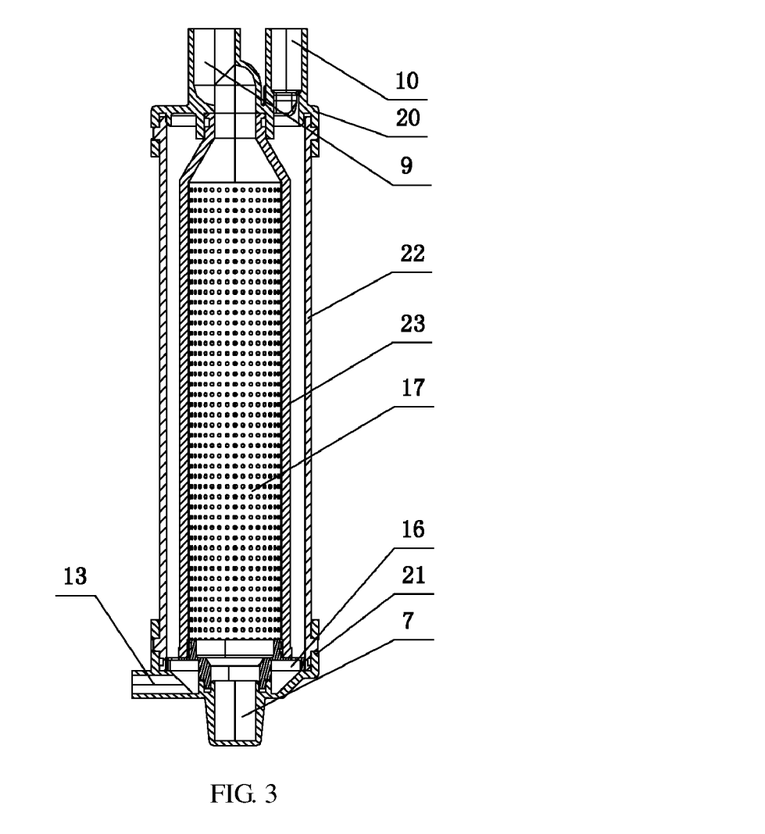
FIG. 3 is a sectional view showing the pre-filter of the present disclosure.

As shown in FIG. 2, FIG. 3 and FIG. 4, the pre-filter 6 in this embodiment includes an outer drum wall 22 having an upper end cover 20 and a lower end cover 21 at two ends of the outer drum wall 22, where the outer drum wall 22 is a hollow cylinder and is internally provided with a filter screen supporting frame 23 which is covered with a filter screen 17, the upper end cover 20 and the lower end cover 21 of the pre-filter 6 are rotatably fixed by a buckle structure, the buckle is provided with an anti-loose bulge, and each of component connections in the pre-filter 6 is provided with a sealing ring to ensure smooth flow without mixed flow in each pipeline. The pre-filter 6 is provided with a first inlet 7 before the filter screen 17, a first outlet 9 before the filter screen 17, and a second outlet 10 after the filter screen 17, where the inlet is positioned on an end cover at one end, the outlets are positioned on an end cover at the other end. The pre-filter is placed vertically when it is in use, the inlet is positioned at an lower part, and the outlets are positioned at an upper part.

An end of the lower end cover 21 is provided with an aeration device 16 positioned between the third inlet 13 and the filter screen 17, the aeration device 16 is a flat plate that fits to the pre-filter 6 in cross-section shape, and is an annular flat plate in this embodiment which is evenly provided with a plurality of air holes 25. The aeration device 16 may enable air pumped in by the air pump 14 to be evenly distributed around the filter screen 17 to thoroughly clean the filter screen without dead angle.

Embodiment II

Figure 5:
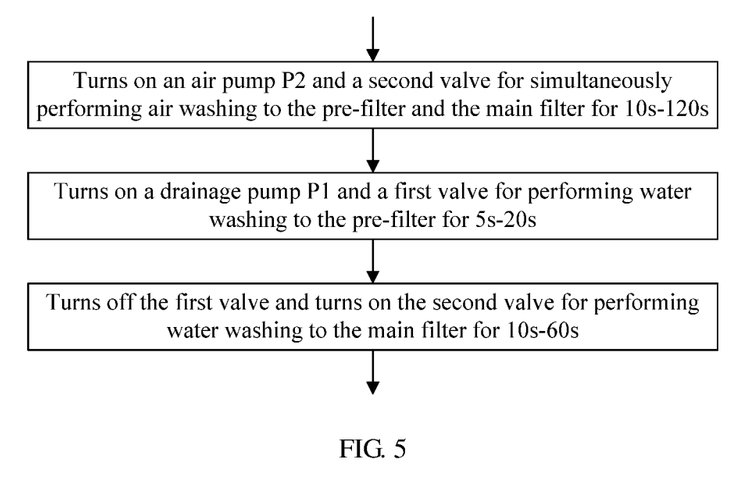
FIG. 5 is a cleaning flowchart according to an embodiment of the present disclosure.

As shown in FIG. 1 and FIG. 5, a cleaning method in this embodiment specifically includes: turning on the air pump 14 and the second valve 19 so that air produced by the air pump 14 enters the pre-filter 6 through the third inlet 13 and is discharged through the second outlet 10, enters the main filter 5 through the second inlet 8 and is discharged through the third outlet 13, and is discharged through the second valve 19 and the washing machine drainage pipe 26. The air produces bubble in water for performing air washing to the filter screens of the pre-filter 6 and/or the main filter 5 by means of bubble motion, explosion or vibration for 10 s-120 s; then turning off the air pump 14 and the second valve 19 and turning on the drainage pump 4 and the first valve 18 so that water flow enters the pre-filter 6 through the first inlet 7 and is drained out through the first outlet 9 for performing water washing to the filter screen 17 of the pre-filter 6 by means of water flow scouring for 5 s-20 s until water flow together with filtered out scraps and particle impurities are drained out through the first valve 18 and the washing machine drainage pipe 26; and turning off the first valve 18 and turning on the second valve 19 so that water flow enters the pre-filter 6 through the first inlet 7 and is drained out through the second outlet 10, and enters the main filter 5 through the second inlet 8 and is drained out through the third outlet 11 for performing water washing to the filter screen of the main filter 5 for 10 s-60 s until water flow together with filtered out scraps and particle impurities are drained out through the second valve and the washing machine drainage pipe.

Embodiment III

Figure 6:
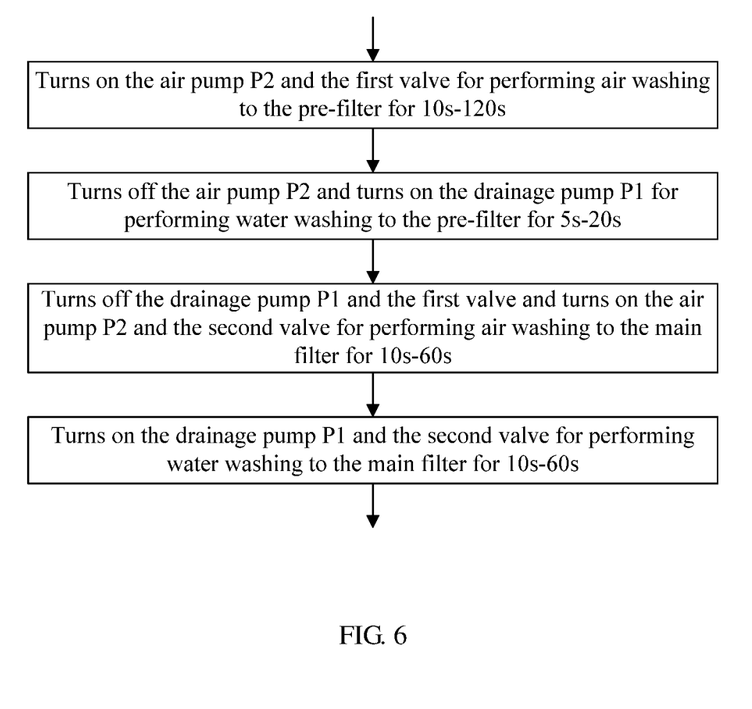
FIG. 6 is a cleaning flowchart according to another embodiment of the present disclosure.

As shown in FIG. 1 and FIG. 6, a cleaning method in this embodiment specifically includes: turning on the air pump 14 and the first valve 18 so that air produced by the air pump 14 enters the pre-filter 6 through the third inlet 13 and is discharged through the second outlet 10, and is discharged through the first valve 18 and the washing machine drainage pipe 26, and the air produces bubble in water for performing air washing to the filter screen 17 of the pre-filter 6 by means of bubble motion, explosion or vibration for 10 s-120 s; then turning off the air pump 14 and turning on the drainage pump 4 so that water flow enters the pre-filter 6 through the first inlet 7 and is drained out through the first outlet 9 for performing water washing to the filter screen 17 of the pre-filter 6 by means of water flow scouring for 5 s-20 s until water flow together with filtered out scraps and particle impurities are drained out through the first valve 18 and the washing machine drainage pipe 26; turning off the drainage pump 4 and the first valve 18 and turning on the air pump 14 and the second valve 19 so that air produced by the air pump 14 enters the pre-filter 6 through the third inlet 13 and is discharged through the second outlet 10, enters the main filter 5 through the second inlet 8 and is discharged through the third outlet 11, and is discharged through the second valve 19 and the washing machine drainage pipe 26, and the air produces bubble in water for performing air washing to the filter screens of the pre-filter 6 and the main filter 5 by means of bubble motion, explosion or vibration for 10 s-60; and turning off the air pump 14 and turning on the drainage pump 4 so that water flow enters the pre-filter 6 through the first inlet 7 and is drained out through the second outlet 10, enters the main filter 5 through the second inlet 8 and is drained out through the third outlet 11 for performing water washing to the filter screen of the main filter 5 for 10 s-60 s until water flow together with filtered out scraps and particle impurities are drained out through the second valve and the washing machine drainage pipe.

Embodiment IV

Figure 7:
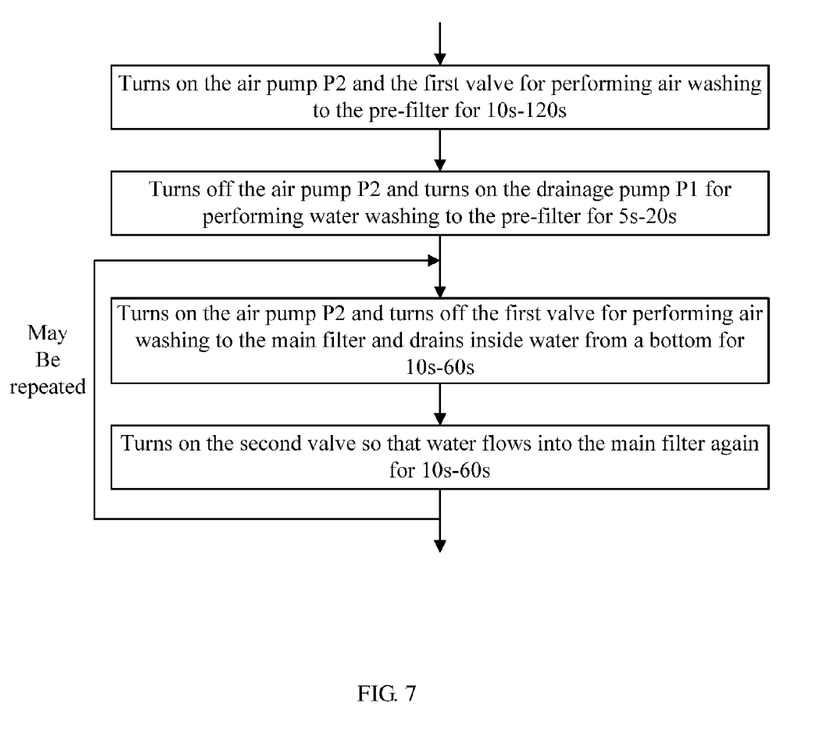
FIG. 7 is a cleaning flowchart according to still another embodiment of the present disclosure.

As shown in FIG. 1 and FIG. 7, a cleaning method in this embodiment specifically includes: turning on the air pump 14 and the first valve 18 so that air produced by the air pump 14 enters the pre-filter 6 through the third inlet 13 and is discharged through the second outlet 10, and is discharged through the first valve 18 and the washing machine drainage pipe 26, and the air produces bubble in water for performing air washing to the filter screen 17 of the pre-filter 6 by means of bubble motion, explosion or vibration for 10 s-120 s; then turning off the air pump 14 and turning on the drainage pump 4 so that water flow enters the pre-filter 6 through the first inlet 7 and is drained out through the first outlet 9 for performing water washing to the filter screen 17 of the pre-filter 6 by means of water flow scouring for 5 s-20 s until water flow together with filtered out scraps and particle impurities are drained out through the first valve 18 and the washing machine drainage pipe 26; and turning off the drainage pump 4 and the first valve 18 and turning on the air pump 4 for performing air washing to the main filter 5 until water flow inside the main filter is drained out through the second inlet for 5 s-20 s; after water flow inside the main filter is thoroughly drained out, turning on the second valve 19 for 10 s-60 s so that water flow flows back to the main filter 5, where the second valve may be repeatedly turned on/off for many times to control water flow to flow in/out of the main filter 5.

Embodiment V

Figure 8:
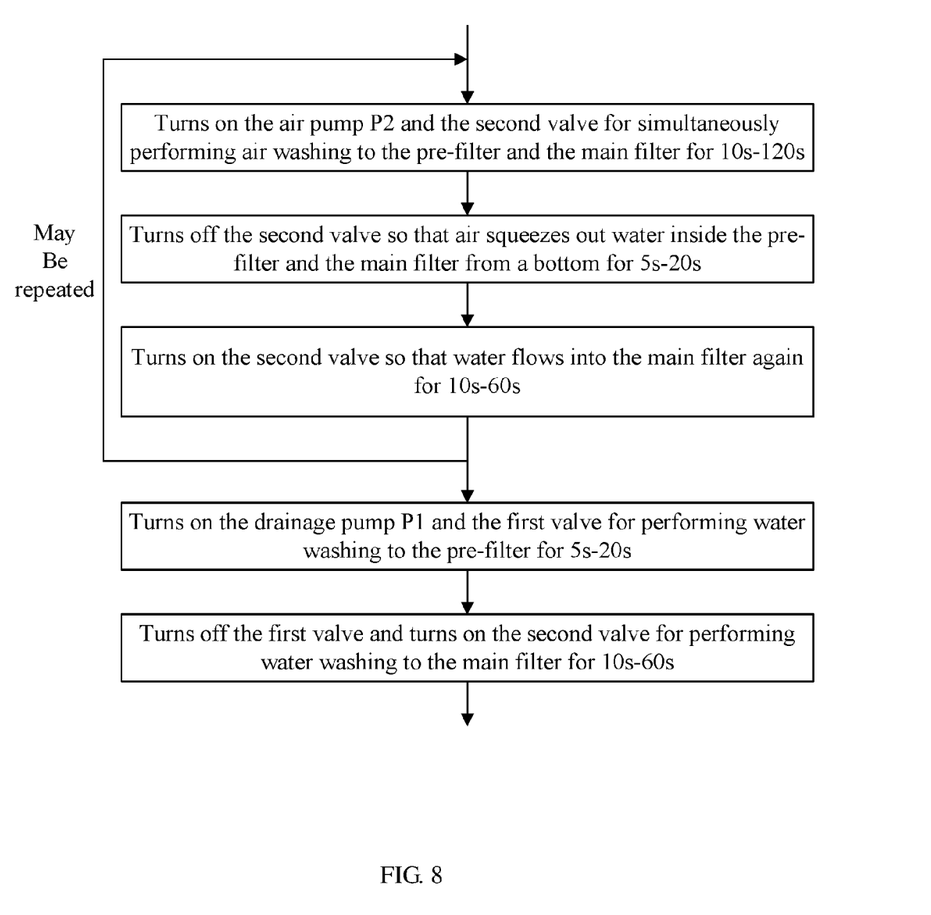
FIG. 8 is a cleaning flowchart according to still another embodiment of the present disclosure.

As shown in FIG. 1 and FIG. 8, a cleaning method in this embodiment specifically includes: turning on the air pump 14 and the second valve 19 so that air produced by the air pump 14 enters the pre-filter 6 through the third inlet 13 and is discharged through the second outlet 10, enters the main filter 5 through the second inlet 8 and is discharged through the third outlet 13, and is discharged through the second valve 19 and the washing machine drainage pipe 26, and the air produces bubble in water for performing air washing to the filter screens of the pre-filter 6 and the main filter 5 by means of bubble motion, explosion or vibration for 10 s-120 s; turning off the second valve 19 for performing air washing to the main filter 5 for 5 s-20 s, so that water flow inside the main filter is drained out from the second inlet; after water flow inside the main filter is thoroughly drained out, turning on the second valve 19 for 10 s-60 s so that water flow flows back to the main filter 5, where the second valve may be repeatedly turned on/off for many times to control water flow to flow in/out of the main filter 5; turning off the air pump 14 and the second valve 19 and turning on the drainage pump 4 and the first valve 18 so that water flow enters the pre-filter 6 through the first inlet 7 and is drained out through the first outlet 9 for performing water washing to the filter screen 17 of the pre-filter 6 by means of water flow scouring for 5 s-20 s until water flow together with filtered out scraps and particle impurities are drained out through the first valve 18 and the washing machine drainage pipe 26; and turning off the first valve 18 and turning on the second valve 19 so that water flow enters the pre-filter 6 through the first inlet 7 and is drained out through the second outlet 10, enters the main filter 5 through the second inlet 8 and is drained out through the third outlet 11 for performing water washing to the filter screen of the main filter 5 for 10 s-60 s until water flow together with filtered out scraps and particle impurities are drained out through the second valve and the washing machine drainage pipe.

Embodiment 6

Figure 9:
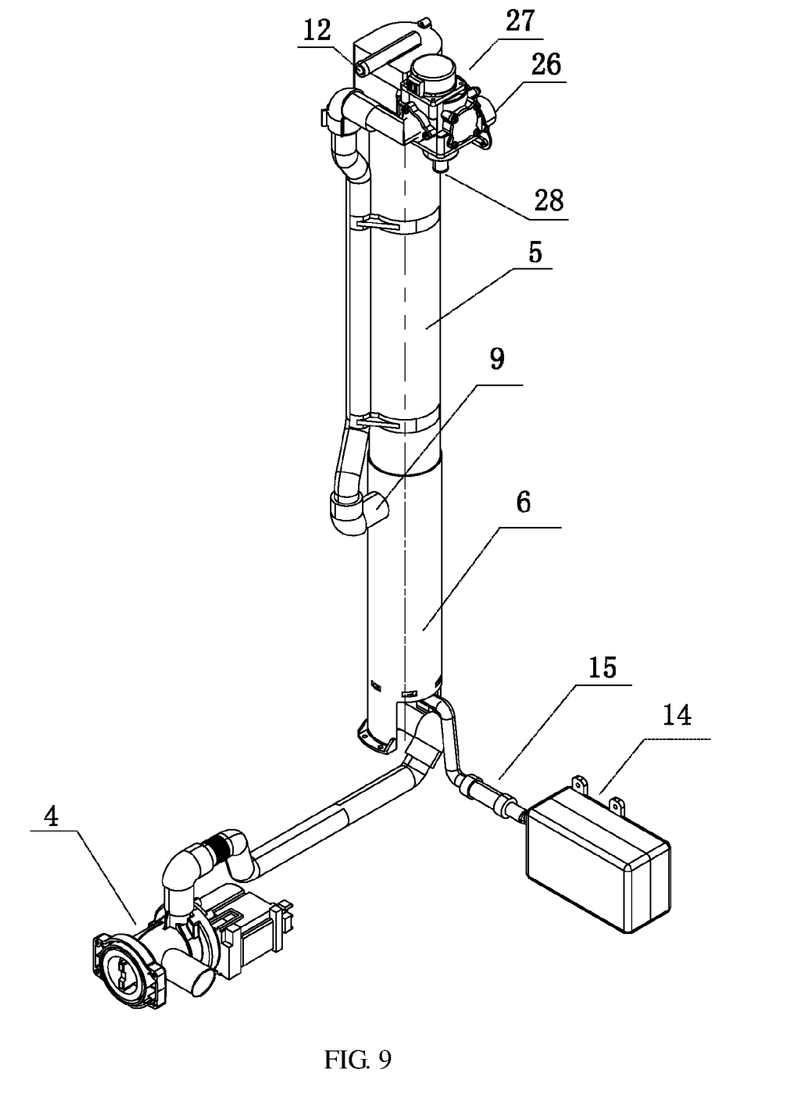
FIG. 9 is a schematic integratively-modular tridimensional structural diagram showing the pre-filter and a main filter of the present disclosure.
Figure 10:
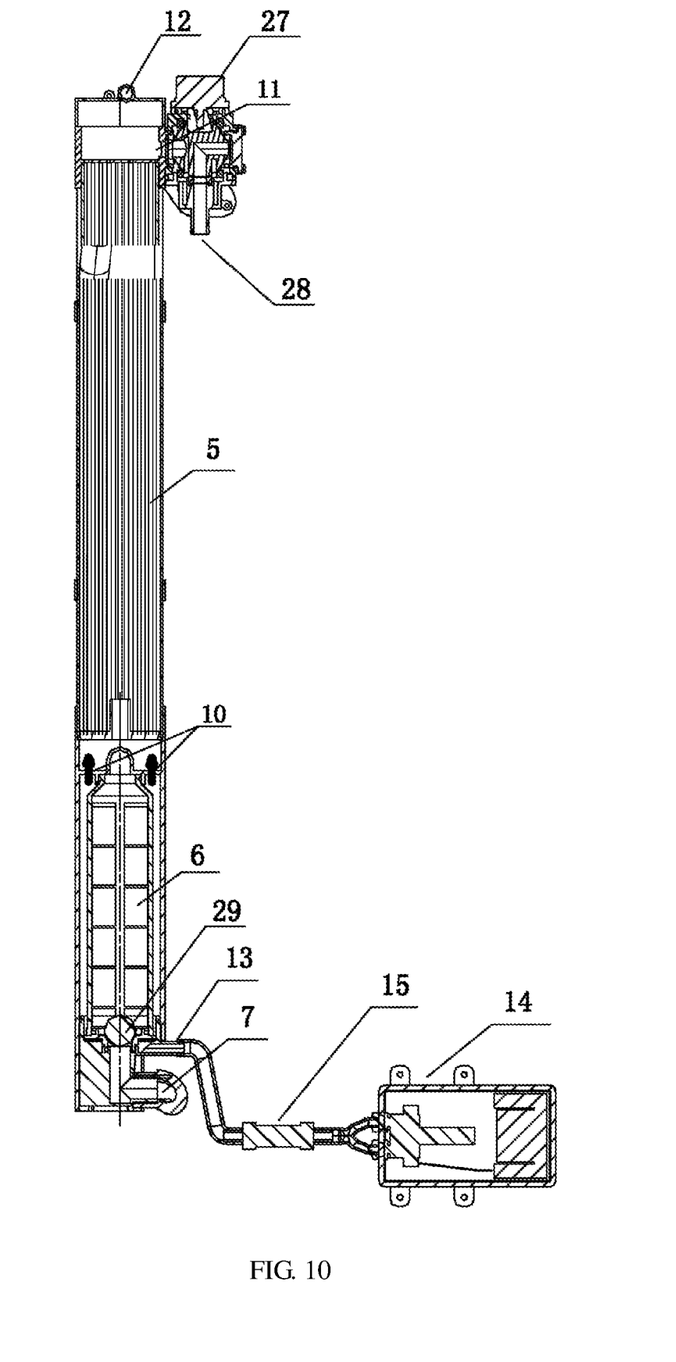
FIG. 10 is an integratively-modular sectional view showing the pre-filter and the main filter of the present disclosure.

As shown in FIG. 1, FIG. 9 and FIG. 10, in the water-saving washing machine of the present disclosure adopting an integrative design, the pre-filter 6 and the main filter 5 are connected to an entirety to form an integrative module by means of bonding, welding or other ways, and during installation the module is directly installed on the existing washing machine, thereby simplifying the installation and reducing space occupation. Specifically, following technical solutions are adopted.

In the water-saving washing machine of the present disclosure, the pre-filter 6 is respectively provided with a first inlet 7 and a second outlet 10, the main filter 5 is provided with a second inlet 8 and a fourth outlet 12, the first inlet 7 is connected to the drainage pump 4, the second outlet 10 is connected to the second inlet 8, the fourth outlet 12 is connected to the outer drum water inlet 3; the first inlet 7 is communicated with the drainage pump 4 and inside of the filter screen of the pre-filter 6, the second outlet 10 and the second inlet 8 are respectively communicated with outside of the filter screen of the pre-filter 6 and outside of the filter screen of the main filter 5, the fourth outlet 12 is communicated with inside of the filter screen of the main filter 5 and inside of the washing drum; and the pre-filter 6 and the main filter 5 are of an integrative design, and the second outlet 10 of the pre-filter 6 is communicated with the second inlet 8 of the main filter 5.

As an embodiment of the present disclosure, the pre-filter 6 includes an upper end cover 20 and a lower end cover 21, a filter screen is disposed between the upper end cover 20 and the lower end cover 21, the upper end cover 20 and a bottom of the main filter 5 are connected together; there are a plurality of the second outlets 10 which are evenly disposed on the upper end cover 20, the first inlet 7 is disposed on the lower end cover 21, the second inlet 8 is disposed at bottom of the main filter; and the second outlets 10 directly lead to the second inlet 8 without pipeline connection.

The pre-filter 6 and the main filter 5 of the present disclosure adopt an integrative structural design, specifically the upper end cover 20 of the pre-filter 6 and a lower end of the main filter 5 are connected together, specifically by means of bonding, welding or other ways, and the second outlets 10 of the pre-filter 6 are directly connected to the second inlet 8 of the main filter 5 without pipeline connection so that water filtered by the pre-filter 6 directly enters the inside of the filter screen of the main filter 5 through the second outlets 10 for further filtration, and setting of a plurality of the second outlets 10 may increase water inflow of the main filter 5, thereby increasing filtration efficiency.

In the water-saving washing machine of the present disclosure, the pre-filter 6 and the main filter 5 adopt an integrative structural design. The pre-filter 6 and the main filter 5 are designed as an integrative module, which not only greatly reduces occupied space, but also dispenses with connecting the pre-filter 6 with the main filter 5 by using pipelines. Therefore, on one hand, pipelines may be saved and cost may be reduced, and on the other hand, an installation process may be simplified and a working efficiency may be improved.

In the water-saving washing machine of the present disclosure, the pre-filter 6 and the main filter 5 adopt an integrative structural design, so that the second outlet 10 of the pre-filter 6 is coincident with the second inlet 8 of the main filter 5, thereby avoiding pipeline connection. In this way, it is possible to effectively solve a problem that an effect in cleaning the filter screens is poor due to attenuation of airflow produced by the air pump 14 in a connecting pipeline when air washing is performed on the pre-filter 6 and the main filter 5.

Further, the pre-filter 6 is further provided with a first outlet 9 connected to a washing machine drainage pipe 26; the main filter 5 is provided with a third outlet 11 connected to the washing machine drainage pipe 26; the first outlet 9 is communicated with the inside of the filter screen of the pre-filter 6 and the washing machine drainage pipe 26, and the third outlet 11 is communicated with the inside of the filter screen of the main filter 5 and the washing machine drainage pipe 26.

As an embodiment of the present disclosure, three valves as shown in FIG. 1, namely the first valve 18, second valve 19 and third valve 30 are replaced by a switching valve 27 internally provided with multiple pathways, specifically, the circulating pipeline is provided with the switching valve 27 communicated with the first outlet 9, third outlet 11 and washing machine drainage pipe 26. The first outlet 9, third outlet 11 and washing machine drainage pipe 26 are connected to the switching valve 27, and the switching valve 27 may turn on/off a pre-filter drain channel formed between the first outlet 9 and an outlet of the washing machine drainage pipe 26, and a main filter drain channel formed between the third outlet 11 and the outlet of the washing machine drainage pipe 26.

Further, the outer drum 1 is further provided with a spraying nozzle 28, the switching valve 27 is also connected to the spraying nozzle 28, and the switching valve 27 may turn on/off a spraying pathway formed between the first outlet 9 and the spraying nozzle 28.

The water-saving washing machine of the present disclosure adopts a switching valve 27 having multiple pathways which connects the first outlet 9, third outlet 11, fourth outlet 12, spraying nozzle 28 of the outer drum and washing machine drainage pipe 26 together, the first valve 18, second valve 19 and third valve 30 disposed as in FIG. 1 are replaced, on/off of different pathways are implemented by controlling the switching valve 27, thereby reducing installation space and assembly process, making it easy to control, and saving assembly cost and control circuit cost.

As an embodiment of the present disclosure, the switching valve 27 of the present disclosure is a ball valve internally provided with multiple pathways in which a basic setting is that a pre-filter drain pathways (a major drainage pathway) is communicated with the first outlet 9 and the washing machine drainage pipe 26; a main filter drain pathways is communicated with the third outlet and the washing machine drainage pipe 26; a spraying pathways is communicated with the first outlet 9 and the spraying nozzle 28; and a circulating filtration pathway is in a full-closed status. Moreover, rotation of a stepper motor is controlled by a program to control rotation of the ball to select a set pathway; and only one of the pathways of the ball valve can be turned on in a same status.

The integrative structure of the pre-filter 6 and the main filter 5 of the present disclosure may provide a rigid connection for a water-saving module, minimize occupied space and maximize saving of use of pipelines; and use of the switching valve 27 may replace three valves, reduce two-channel electric control and promote line optimization.

Reference is made to various working processes of the water-saving washing machine below.

In a circulating filtration processes, the switching valve 27 is controlled in the full-closed status, the drainage pump 4 is turned on, washing/rinse water in the outer drum 1 flows in the pre-filter 6 through a pipeline; after being filtered by the pre-filter 6, large-particle impurities in the washing/rinse water are basically filtered out, filtered washing/rinse water flows in the main filter 5 from an outer side of the filter screen, then washing/rinse water filtered by the main filter 5 becomes clean water and flows out from the fourth outlet 12 and flows back to the outer drum 1 through a pipeline so that washing/rinse water in the drum is more and more limpid, which gives people a feeling of always washing/rinsing in clean water.

In a drainage process, the switching valve is controlled at the pre-filter drain pathway (the major drainage pathway), and the drainage pump 4 is turned on to drain water out of the washing machine.

In a spraying process, the switching valve 27 is controlled at the spraying pathway, the drainage pump 4 is turned on to make water in the drum flow in the pre-filter 6 through a pipeline and then flow back to the drum of the washing machine through the first outlet 9 of the pre-filter 6 and the spraying nozzle 28, thereby completing the spraying circulation process.

In a pre-filter cleaning process, in the pre-filter 6 after circulation, intercepted particles, sewages and the like are attached to an inner wall of the filter screen; the switching valve 27 is controlled at the drain pathway (the major drainage pathway) of the pre-filter 6, the lower end cover 21 of the pre-filter 6 is provided with the third inlet 13, air is pumped by the air pump 14 and is evenly distributed through the aeration device 16 on the lower end cover 21 of the pre-filter 6, and the air is vibrated by the filter screen of the pre-filter 6 to enable particles and sewages on the filter screen to break away from the filter screen, and then the drainage pump 4 is turned on to drain the particles and sewages broken away out of the washing machine.

In a main filter cleaning process, in the main filter 5 after circulation, intercepted particles, sewages and the like are attached to an outer wall of the filter screen of the main filter; the switching valve 27 is controlled at the main filter drain pathway, air is pumped by the air pump 14 to the main filter through the pre-filter to enable particles and sewages on the filter screen to break away from the filter screen, and then the drainage pump 4 is turned on to drain the particles and sewages broken away out of the washing machine.

As an embodiment of the present disclosure, the first inlet 7 of the pre-filter 6 is provided with a check device preventing sewage water from flowing back, optionally, the check device is a check ball 29 whose diameter is greater than the diameter of the first inlet, a density of the check ball is greater than that of water, and optionally, the density of the check ball is 1-1.5 times of that of water.

Figure 11:
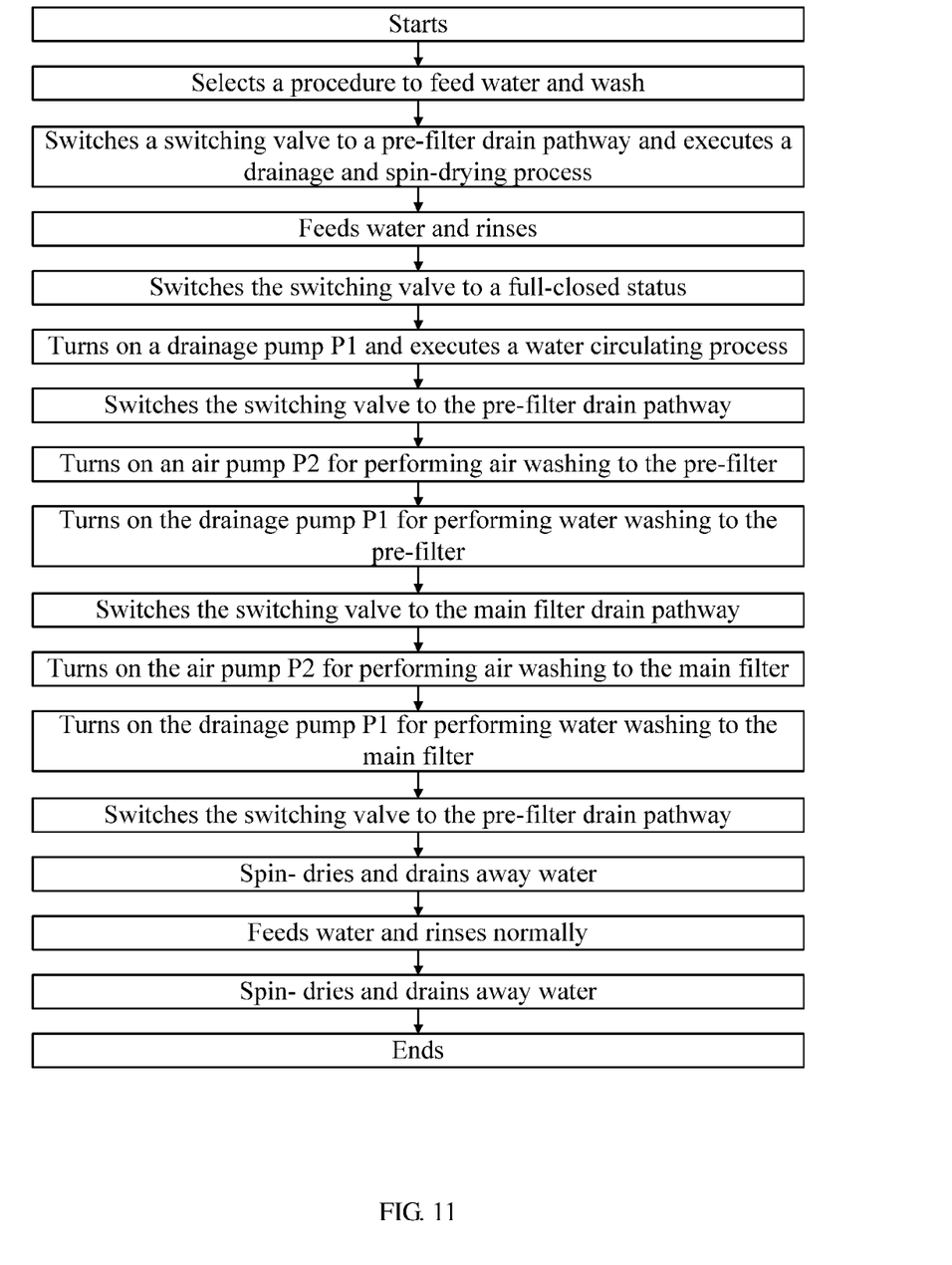
FIG. 11 is a flowchart showing an operation of the washing machine according to an embodiment of the present disclosure.

As shown in FIG. 11, a control method of the washing machine of the present disclosure includes following steps S1 to S17.

in Step S1, initiates a startup procedure;

in Step S2, selects a procedure to start feeding water and washing;

in Step S3, switches a switching valve to a pre-filter drain pathway (a major drainage pathway) and executes a drainage and spin-drying process;

in Step S4, feeds water and rinses;

in Step S5, switches the switching valve to a full-closed status and turns on a circulating filtration pathway;

in Step S6, turns on a drainage pump P1 and executes a circulating filtration process;

in Step S7, switches the switching valve to the pre-filter drain pathway (the major drainage pathway);

in Step S8, turns on an air pump P2 for performing air washing to the pre-filter;

in Step S9, turns on the drainage pump P1 for performing water washing to the pre-filter;

in Step S10, switches the switching valve to the main filter drain pathway;

in Step S11, turns on the air pump P2 for performing air washing to the main filter;

in Step S12, turns on the drainage pump P1 for performing water washing to the main filter;

in Step S13, switches the switching valve to the pre-filter drain pathway;

in Step S14, spin-dries and drains away water;

in Step S15, feeds water and rinses normally;

in Step S16, spin-dries and drains away water; and in Step S17, ends.

The abovementioned embodiments are merely embodiments of the present disclosure. It shall be pointed out that to those of ordinary skill in the art, various modifications and improvements may be made without departing from the principle of the present disclosure, and these modifications and improvements are also deemed to be within the scope of protection of the present disclosure.

What is claimed is:

1. A water-saving washing machine, comprising a washing drum and an outer drum, wherein a circulating pipeline is arranged between an outer drum drainage outlet and an outer drum water inlet, a drainage pump and a main filter are arranged on the circulating pipeline, a pre-filter is further arranged on the circulating pipeline, the pre-filter is located between the drainage pump and the main filter, and a compactness of a filter screen of the pre-filter is lower than that of a filter screen of the main filter;

wherein the pre-filter is provided with a first inlet, the first inlet is connected to an air pump through a pipeline, and the pipeline between the air pump and the first inlet is further provided with a check valve for controlling airflow to flow from the air pump to the pre-filter;

wherein the pre-filter is provided with an aeration device positioned between the first inlet and the filter screen of the pre-filter, the aeration device is a flat plate that fits to the pre-filter in cross-section shape, and the flat plate is evenly provided with a plurality of air holes.

2. The water-saving washing machine of claim 1, wherein a second inlet is disposed before the filter screen of the pre-filter and is communicated with the drainage pump, a third inlet is disposed before the filter screen of the main filter, the pre-filter is provided with a first outlet before the filter screen of the pre-filter and is provided with a second outlet after the filter screen of the pre-filter, the main filter is provided with a third outlet before the filter screen of the main filter and is provided with a fourth outlet after the filter screen of the main filter, the second outlet is communicated with the third inlet, the fourth outlet is communicated with a water inlet of the washing drum, and the first outlet and the third outlet are communicated with a washing machine drainage pipe.

3. The water-saving washing machine of claim 2, wherein a pipeline between the first outlet and the washing machine drainage pipe is provided with a first valve, a pipeline between the third outlet and the washing machine drainage pipe is provided with a second valve, and the first valve and the second valve are electric switching ball valves.

4. The water-saving washing machine of claim 1, wherein inlets of the pre-filter and the main filter are positioned at lower parts, outlets of the pre-filter and the main filter are positioned at upper parts, a pore diameter of the filter screen of the main filter ranges from 0.001 µm to 0.1 µm, the main filter is an external-pressure ultrafiltration membrane, and a pore diameter of the filter screen of the pre-filter ranges from 10 µm to 300 µm.

5. The water-saving washing machine of claim 4, wherein the pore diameter of the filter screen of the main filter ranges from 0.01 µm to 0.1 µm.

6. A control method of the water-saving washing machine of claim 1, wherein a circulating filtration step is added in a washing and/or rinse process, the method comprises: starting the drainage pump, pumping, by the drainage pump, washing water or rinse water to the pre-filter for preliminary filtration by the filter screen of the pre-filter, and to the main filter for deep filtration by the filter screen of the main filter, so that small-particle impurities in the washing water or the rinse water are filtered out by the pre-filter and the main filter, and filtered water flows back to the outer drum through the outer drum water inlet for participation in washing or rinse again.

7. The control method of claim 6, wherein the circulating filtration step at least comprises one intermediate cleaning process of the pre-filter and/or the main filter; the intermediate cleaning process comprises an air washing process in which air is introduced into the pre-filter and/or the main filter for cleaning the filter screen of the pre-filter and/or the filter screen of the main filter by means of bubble motion, explosion or vibration, and/or a water washing process in which water flow is introduced before the filter screens of the pre-filter and/or the filter screen of the main filter so that the water flow is discharged after the filter screens of the pre-filter and/or the filter screen of the main filter to clean out impurities on the filter screens of the pre-filter and/or the filter screen of the main filter by means of water flow scouring.

8. The control method of claim 7, wherein the pre-filter and the main filter are controlled by turning on/off the air pump and turning on/off the valves for separately or simultaneously performing air washing and water washing, which specifically comprises:

turning on the air pump and the second valve for simultaneously performing air washing to the pre-filter and the main filter for 10 s-120 s, turning off the air pump and the second valve and turning on the drainage pump and the first valve for performing water washing to the pre-filter for 5 s-20 s, and turning off the first valve and turning on the second valve for performing water washing to the main filter for 10 s-60 s; or turning on the air pump and the first valve for performing air washing to the pre-filter for 10 s-120 s, turning off the air pump and turning on the drainage pump for performing water washing to the pre-filter for 5 s-20 s, turning off the drainage pump and the first valve and turning on the air pump and the second valve for performing air washing to the main filter for 10 s-60 s, and turning off the air pump and turning on the drainage pump for performing water washing to the main filter for 10 s-60 s; or turning on the air pump and the first valve for performing air washing to the pre-filter for 10 s-120 s, turning off the air pump and turning on the drainage pump for performing water washing to the pre-filter for 5 s-20 s, turning off the drainage pump and the first valve and turning on the air pump for performing air washing to the main filter for 5 s-20 s so that water flow inside the main filter is drained out from the third inlet; after the water flow inside the main filter is thoroughly drained out, turning on the second valve for 10 s-60 s so that water flow flows back to the main filter, where the second valve may be repeatedly turned on/off for many times; or turning on the air pump and the second valve for simultaneously performing air washing to the pre-filter and the main filter for 10 s-120 s, turning off the second valve for 5 s-20 s so that water flow inside the pre-filter and the main filter is drained out from bottom until water flow is thoroughly drained out, turning on the second valve for 10 s-60 s so that water flow flows back to the main filter, where the second valve may be repeatedly turned on/off for many times; turning off the air pump and the second valve and turning on the drainage pump and the first valve for performing water washing to the pre-filter for 5 s-20 s, and turning off the first valve and turning on the second valve for performing water washing to the main filter for 10 s-60 s.

9. The control method of claim 6, wherein the washing drum is internally provided with a turbidity detecting device for detecting turbidity of inside washing water or rinse water in real time, a circulating filtration procedure is started when a turbidity is less than or equal to a set value, otherwise the circulating filtration procedure is not started.

10. The water-saving washing machine of claim 1, wherein the pre-filter is provided with a second inlet and a second outlet, the main filter is provided with a third inlet and a fourth outlet, the second inlet is connected to the drainage pump, the second outlet is connected to the third inlet, the fourth outlet is connected to the outer drum water inlet; the second inlet is communicated with the drainage pump and inside of the filter screen of the pre-filter, the second outlet and the third inlet are respectively communicated with outside of the filter screen of the pre-filter and outside of the filter screen of the main filter, the fourth outlet is communicated with inside of the filter screen of the main filter and inside of the washing drum; and the pre-filter and the main filter are of an integrative design, and the second outlet of the pre-filter is communicated with the third inlet of the main filter.

11. The water-saving washing machine of claim 10, wherein the pre-filter comprises an upper end cover and a lower end cover, the filter screen of the pre-filter is disposed between the upper end cover and the lower end cover, the upper end cover and a bottom of the main filter are connected together; there are a plurality of the second outlets which are evenly disposed on the upper end cover, the second inlet is disposed on the lower end cover, the third inlet is disposed at bottom of the main filter; and the second outlets directly lead to the third inlet without pipeline connection.

12. The water-saving washing machine of claim 10, wherein the pre-filter is further provided with a first outlet connected to a washing machine drainage pipe; the main filter is provided with a third outlet connected to the washing machine drainage pipe; the first outlet is communicated with the inside of the filter screen of the pre-filter and the washing machine drainage pipe, and the third outlet is communicated with the outside of the filter screen of the main filter and the washing machine drainage pipe.

13. The water-saving washing machine of claim 12, wherein the circulating pipeline is provided with a switching valve communicated with the first outlet, the third outlet and the washing machine drainage pipe; the switching valve may turn on/off a pre-filter drain channel formed between the first outlet and an outlet of the washing machine drainage pipe, and a main filter drain channel formed between the third outlet and the outlet of the washing machine drainage pipe; and the switching valve is a ball valve internally provided with multiple pathways.

14. The water-saving washing machine of claim 13, wherein the outer drum is further provided with a spraying nozzle, the switching valve is also connected to the spraying nozzle, and the switching valve may turn on/off a spraying pathway formed between the first outlet and the spraying nozzle.

15. The water-saving washing machine of claim 10, wherein the second inlet of the pre-filter is provided with a check device preventing sewage water from flowing back, the check device is a check ball whose diameter is greater than the diameter of the second inlet, a density of the check ball is greater than that of water, and the density of the check ball is 1-1.5 times of that of water.

* * * * *